Patented Aug. 30, 1927.

1,640,364

UNITED STATES PATENT OFFICE.

JOHN McGAVACK OF JACKSON HEIGHTS, NEW YORK, ASSIGNOR TO REVERE RUBBER COMPANY, OF CHELSEA, MASSACHUSETTS, A CORPORATION OF RHODE ISLAND.

PROCESS FOR PREPARING RUBBER-CONTAINING PLASTICS AND PRODUCTS OBTAINED THEREBY.

No Drawing. Application filed March 24, 1925. Serial No. 18,057.

This invention relates to an improved method for making rubber-containing plastics, particularly rubber combined with a phenol and an aldehyde.

In a prior application Serial No. 670,104, filed October 22, 1923, a method is disclosed for preparing condensation products or chemical combinations of rubber, a phenol and an aldehyde. In this application the combination of these three materials is effected by first forming a chloride of the rubber, preferably pale crepe, and then causing the phenol and the aldehyde to combine therewith.

The present invention is concerned with an improved method of making such combinations, and it is the principal object of the invention to employ vulcanized rubber as the starting material. Another object of the invention is to provide a less expensive method of making rubber-phenol-aldehyde condensation products. A still further object of the invention is to produce desirable plastics from such condensation products of rubber, phenol and aldehyde.

With the use of vulcanized rubber as a preferred raw material, but not desiring to limit the invention beyond what may be required by the prior art, the invention broadly stated comprises combining chlorine, a phenol, and an aldehyde with vulcanized rubber and separating from the reaction mixture a plastic which consists of rubber combined with chlorine, a phenol and an aldehyde. More particularly the invention consists in chlorinating vulcanized rubber, and combining therewith a phenol and an aldehyde and separating the combination product. The invention also includes the formation of articles and objects from the combination product thus produced.

The following example is illustrative of the invention: 100 grams of ground scrap or vulcanized rubber containing 1 to 5% of combined sulphur are dispersed or swollen in a container with 1000 grams of benzol. After dispersion is effected, chlorine is then introduced into the dispersion at a rate of about 10 ccs. per minute per gram of rubber and the introduction is continued until the rubber molecule contains approximately 56–58% of chlorine. To this is then added a mixture of 150 grams of phenol and 150 grams of 40% formaldehyde solution in water. The mixture is then heated under a reflux condenser at the boiling point of the solvent for 2–3 hrs. The product thus obtained is a thick brownish-white emulsion. The material may then be steam distilled or otherwise heated to remove the excess of chlorine and solvent, after which the product is washed and dried. The final product contains approximately 35% of chlorine and also contains, in combination with the rubber, both phenol and formaldehyde.

The above proportions are not absolute, but may be varied, depending on other conditions. Instead of benzol, other rubber solvents may be employed, such as carbon tetrachloride, solvent naphtha, chloroform, and others. It is known that these solvents do not dissolve vulcanized rubber, but merely cause the latter to swell. The amount of solvent in the above example is approximately 10 to 1 of rubber, but this amount will vary when other solvents are used. A suitable example of vulcanized rubber is that obtained from the scrap of inner tube manufacture, but obviously other sources of vulcanized rubber may be utilized.

If desired the vulcanized rubber may have been given a reclaiming treatment whereby the free sulphur and certain other ingredients are removed, but this is not necessary, as the chlorination treatment has the effect of removing substantially all of the sulphur as sulphur chloride, sulphur dioxide, hydrogen sulphide, or as free sulphur, and the removal includes practically all of the combined sulphur, thus leaving the rubber molecule containing practically nothing but chlorine.

Other phenols may be employed, such as cresol and higher homologues of phenol, and the higher aldehydes may be used such as acetaldehyde etc. With certain types of vulcanized rubber, quantities of compounding ingredients are present. These may be allowed to remain in the vulcanized rubber, or they may be partially removed prior to the treatment, but it will be found more economical to use what is known as a pure gum stock in those instances where the presence of compounding ingredients is not desired in the final product, or where certain specific ingredients are desired, such as wood flour, asbestos, zinc oxide or other of the compounding ingredients known to the rubber industry. These may be added at any stage of the process.

The final product made according to the above example has a molding temperature of approximately 145°–150° C. and has a transverse tensile strength of approximately 7000–8000 lbs. per square inch. Assuming the dielectric constant of air as one, the product made according to the above example possesses a constant in the neighborhood of 2 to 3. The material may be employed in the manufacture of molded plastics, such as insulating materials, electrical instrument parts, and in other instances where hard rubber and "bakelite" are now employed.

The term "vulcanized rubber" in the appended claims is understood to include freshly vulcanized rubber, scrap vulcanized rubber, reclaimed or unreclaimed. The terms "phenol" and "aldehyde" are generic in their meaning. Other halogens may be employed and the claims are to be so understood.

Having thus described my invention, what I claim and desire to protect by Letters Patent is:

1. A process for making rubber combinations which consists in treating vulcanized rubber with a rubber solvent, combining a halogen, a phenol, and an aldehyde with the rubber, and recovering a combination of rubber, halogen, phenol and aldehyde.

2. A process for making rubber combinations which consists in treating vulcanized rubber with a rubber solvent, introducing a halogen, a phenol, and an aldehyde, heating the mixture to effect combination of the ingredients with the rubber, and recovering the reaction product.

3. A process for making rubber combinations which consists in treating vulcanized rubber with a rubber solvent, introducing a halogen, adding a phenol and an aldehyde, causing said materials to combine with the rubber, and recovering the combination product.

4. A process for making rubber combinations which consists in treating vulcanized rubber with a rubber solvent, combining chlorine with the rubber, introducing a phenol and an aldehyde into the chlorinated rubber, removing the excess of chlorine, phenol and aldehyde, and recovering the condensation product of rubber and said other ingredients 5. A process for making rubber combinations which consists in treating vulcanized rubber with benzol, removing sulphur from the vulcanized rubber by chlorination, adding phenol and an aldehyde to the chlorinated rubber, heating to combine said phenol and aldehyde with the chlorinated rubber, removing the excess of chlorine, phenol, and aldehyde, and recovering a rubber condensation product of phenol and aldehyde containing chlorine.

6. A process for making rubber combinations which consists in treating vulcanized rubber with benzol, substantially eliminating the sulphur from the vulcanized rubber by chlorination, adding phenol and formaldehyde to the chlorinated rubber, heating to combine said phenol and formaldehyde with the chlorinated rubber, removing the excess of chlorine, phenol, and formaldehyde and recovering a rubber condensation product of phenol and formaldehyde containing chlorine.

7. A process for making rubber combinations which consists in treating vulcanized rubber with benzol, substantially eliminating the sulphur from the vulcanized rubber by chlorination, adding phenol and formaldehyde to the chlorinated rubber, heating to combine said phenol and formaldehyde with the chlorinated rubber, heating and washing to remove excess chlorine, phenol and formaldehyde, and recovering a condensation product containing rubber, chlorine, phenol and formaldehyde, 8. A process for making rubber combinations which consists in treating vulcanized rubber with benzol, substantially eliminating the sulphur from the vulcanized rubber by chlorination, adding phenol and formaldehyde to the chlorinated rubber heating to combine said phenol and formaldehyde with the chlorinated rubber, heating and washing to remove excess chlorine, phenol and formaldehyde, drying and recovering a condensation product containing rubber, chlorine, phenol and formaldehyde.

Signed at New York, county and State of New York, this 20th day of March, 1925.

JOHN McGAVACK.